(12) United States Patent
Li et al.

(10) Patent No.: US 10,860,494 B2
(45) Date of Patent: *Dec. 8, 2020

(54) FLUSHING PAGES FROM SOLID-STATE STORAGE DEVICE

(71) Applicant: EMC IP Holding Company LLC, Hopkinton, MA (US)

(72) Inventors: Liam Li, Beijing (CN); Xinlei Xu, Beijing (CN); Jian Gao, Beijing (CN); Lifeng Yang, Beijing (CN); Changyu Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,291

(22) Filed: Jul. 17, 2019

(65) Prior Publication Data
US 2019/0340132 A1 Nov. 7, 2019

Related U.S. Application Data

(63) Continuation of application No. 15/712,483, filed on Sep. 22, 2017, now Pat. No. 10,417,137.

(30) Foreign Application Priority Data

Sep. 23, 2016 (CN) .......................... 2016 1 0849719

(51) Int. Cl.
*G06F 12/0891* (2016.01)
*G06F 11/10* (2006.01)
(Continued)

(52) U.S. Cl.
CPC ...... *G06F 12/0891* (2013.01); *G06F 11/1076* (2013.01); *G06F 12/0804* (2013.01);
(Continued)

(58) Field of Classification Search
CPC .................................................. G06F 12/0891
(Continued)

(56) References Cited

U.S. PATENT DOCUMENTS 6,735,679 B1 5/2004 Herbst et al.
2004/0128470 A1 7/2004 Hetzler et al.
(Continued)

FOREIGN PATENT DOCUMENTS

CN 102622309 8/2012
CN 103136121 6/2013
(Continued)

*Primary Examiner* — Jae U Yu
(74) *Attorney, Agent, or Firm* — BainwoodHuang

(57) ABSTRACT

Embodiments of the present disclosure relate to a method and device for flushing pages from a solid-state storage device. Specifically, the present disclosure discloses a method of flushing pages from a solid-state storage device comprising: determining a first number based on a period length of one flushing cycle and a period length required for building one flushing transaction, the first number indicating a maximum number of flushing transactions that can be built in the flushing cycle; and flushing pages from the solid-state storage device with an upper limit of the first number in the flushing cycle. The present disclosure also discloses a device for flushing pages from a solid-state storage device and a computer program product for implementing steps of a method of flushing pages from a solid-state storage device.

20 Claims, 9 Drawing Sheets

(51) Int. Cl.
*G06F 12/0804* (2016.01)
*G06F 12/0868* (2016.01)
*G06F 12/0871* (2016.01)
*G06F 12/0882* (2016.01)
*G06F 12/1009* (2016.01)
G06F 12/0897 (2016.01)

(52) U.S. Cl.
CPC ...... *G06F 12/0868* (2013.01); *G06F 12/0871* (2013.01); *G06F 12/0882* (2013.01); *G06F 12/1009* (2013.01); G06F 12/0897 (2013.01); G06F 2212/1024 (2013.01); G06F 2212/214 (2013.01); G06F 2212/217 (2013.01); G06F 2212/262 (2013.01); G06F 2212/466 (2013.01); G06F 2212/502 (2013.01)

(58) Field of Classification Search
USPC ........................................................ 711/135
See application file for complete search history.

(56) References Cited

U.S. PATENT DOCUMENTS

| | | | |
|---|---|---|---|
| 2009/0168795 A1 | 7/2009 | Segel | |
| 2011/0173395 A1 | 7/2011 | Bhattacharjee et al. | |
| 2015/0293856 A1* | 10/2015 | Zhang | G06F 12/0868 |
| | | | 711/114 |

FOREIGN PATENT DOCUMENTS

| | | |
|---|---|---|
| CN | 103164297 | 6/2013 |
| CN | 103246519 | 8/2013 |
| CN | 103631536 | 3/2014 |

* cited by examiner

FLUSHING PAGES FROM SOLID-STATE STORAGE DEVICE

RELATED APPLICATIONS

This application claim priority from Chinese Patent Application Number CN201610849719.1, filed on Sep. 23, 2016 at the State Intellectual Property Office, China, titled "METHOD AND DEVICE FOR FLUSHING PAGES FROM SOLID STORAGE DEVICE" the contents of which is herein incorporated by reference in its entirety.

FIELD

Embodiments of the present disclosure generally relate to storage technologies, and more specifically, relate to methods and devices for flushing pages from a solid-state storage device.

BACKGROUND

Multi-layer cache stack technologies have been used in storage technologies. In the multi-layer cache stack technologies, a solid-state storage devices, i.e., solid storage disks (SSDs), are used. During applying procedure of the multi-layer cache stack technologies, operations of flushing pages from the solid-state storage device to a hard disk are needed sometimes. However, in the prior art, there are problems such as low throughput of flushing process when performing operations of flushing pages from the solid-state storage device to the hard disk, thereby affecting the efficiency of applying the multi-layer cache stack technologies, and possibly bringing poor user experience to users.

SUMMARY

Generally, embodiments of the present disclosure propose methods of flushing pages from a solid-state storage device.

In a first aspect, an embodiment of the present disclosure provides a method of flushing pages from a solid-state storage device. The method comprises: determining a first number based on a period length of one flushing cycle and a period length required for building one flushing transaction, the first number indicating a maximum number of flushing transactions that can be built during the flushing cycle; and flushing pages from the solid-state storage device with an upper limit of the first number during the flushing cycle.

In a second aspect, an embodiment of the present disclosure provides an electronic device. The electronic device comprises: a processor; and a memory coupled to the processor and storing instructions to be executed by the processor, the instructions, when being executed by the processor, causing the device to execute: determining a first number based on a period length of one flushing cycle and a period length required for building one flushing transaction, the first number indicating a maximum number of flushing transactions that can be built during the flushing cycle; and flushing pages from a solid-state storage device with an upper limit of the first number during the flushing cycle.

In a third aspect, an embodiment of the present disclosure provides a computer program product. The computer program product is tangibly stored on a non-transient computer readable medium and comprises machine executable instructions which, when being executed, cause the machine to execute steps of a method of flushing pages from the solid-state storage device according to the first aspect of the present disclosure.

It will be understood from the following description that, according to embodiments of the present disclosure, it can be realized to build flushing transactions based on use of a central processing unit (CPU) and avoid busy volumes (e.g., flare volumes in the products of EMC company) blocking the flushing process by using queue depths per RAID, thereby the throughput of the flushing process can be improved.

It is to be understood that, what is described in the Summary of the Invention is neither intended to limit the key or critical features of the embodiments of the present disclosure nor intended to limit the scope of the present disclosure. Other features of the present disclosure will become readily apparent from the following description.

BRIEF DESCRIPTION OF THE DRAWINGS

The foregoing and other features, advantages and aspects of various embodiments of the present disclosure will become more apparent in conjunction with the accompanying drawings and with reference to the following detailed description. In the drawings, like or similar reference numerals refer to like or similar elements, wherein.

In all drawings, like or similar reference numerals refer to like or similar elements.

DETAILED DESCRIPTION OF EMBODIMENTS

Figure 1:
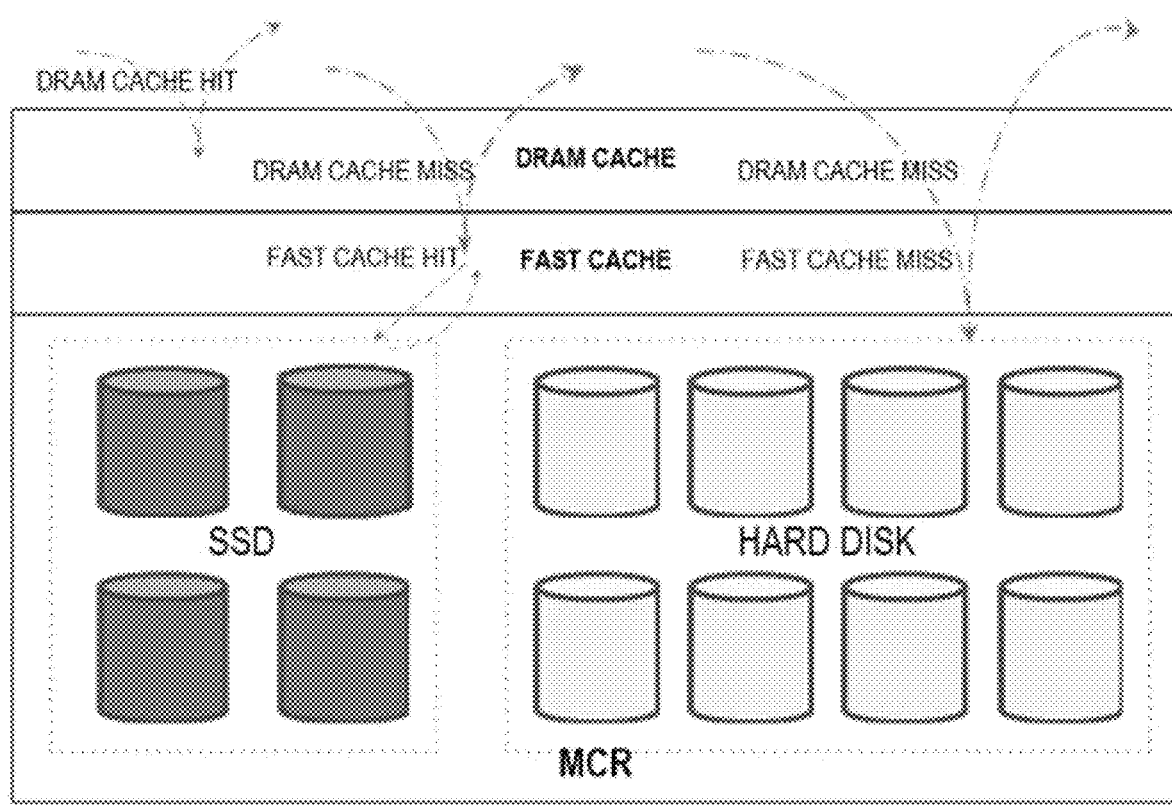
FIG. 1 shows an overview of a multi-layer cache stack in multi-layer cache stack technologies.

Embodiments of the present disclosure will be described in more detail below with reference to the accompanying drawings. While some embodiments of the present disclosure are shown in the drawings, it is to be understood that, the present disclosure may be embodied in various forms and should not be construed as being limited to the embodiments as set forth herein. Rather, these embodiments are provided for the purpose of understanding the present disclosure more thorough and complete. It is to be understood that, the drawings and examples of the present disclosure are provided merely for illustrative purposes and are not intended to limit the scope of the present disclosure.

As used herein, the term "comprise" and its variants are inclusive, i.e. "including but not limited to." The term "based on" means "at least partially based on." The term "one embodiment" means "at least one embodiment;" the term "another embodiment" means "at least one further embodiment." The relevant definitions of other terms are given in the following description.

FIG. 1 shows an overview of a multi-layer cache stack in multi-layer cache stack technologies. The multi-layer cache stack includes three layers from top to bottom, namely, a dynamic random access memory (DRAM) cache layer, an SSD cache layer, and a Redundant Array of Independent Disks (RAID) management layer. In operating, when attempting to read data from a multi-layer cache stack, there are three cases: Case 1, the data is read from the DRAM cache when the data needed to be read is hit in the DRAM cache; Case 2, the data is read from the SSD cache, that is, the data is read from the solid storage disk to which the SSD cache belongs, when the data needed to be read is hit in the SSD cache but not hit in the DRAM cache; Case 3, the data is read from the hard disk (that is, the hard disk drive, HDD) when the data needed to be read is neither hit in the DRAM cache nor hit in the SSD cache.

Figure 2:
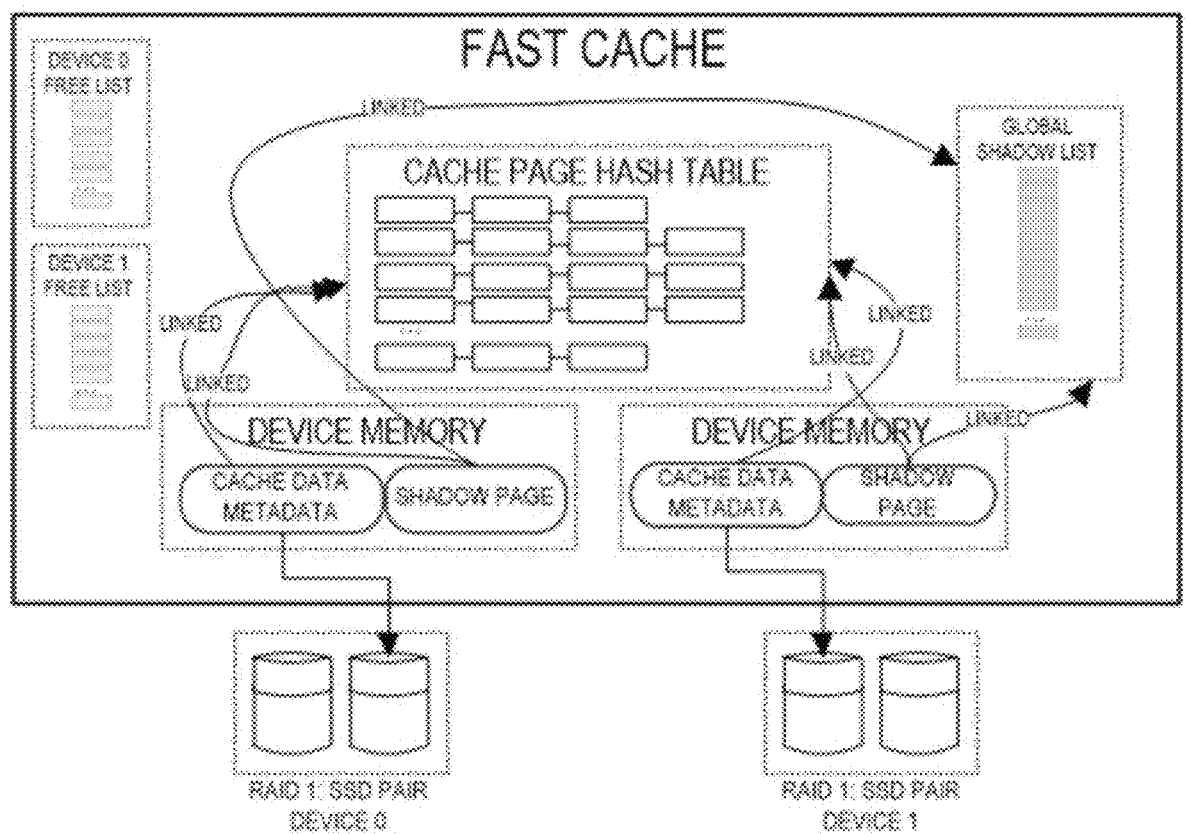
FIG. 2 is a schematic diagram of an SSD cache device.

According to FIG. 1, the SSD cache is the second layer cache in the multi-layer cache stack. FIG. 2 is a schematic diagram of an SSD cache device. As shown in FIG. 2, the SSD cache device has two RAID 1, that is, device 0 and device 1, which are configured with two solid-state storage devices (SSD pair). It should be understood that, the type of RAID, the number of RAID 1, and the numbers of solid-state storage devices in each RAID 1 in FIG. 2 are examples but not limitations. In the SSD cache device shown in FIG. 2, the SSD cache deems each pair of the solid-state storage devices as a device that can be used to store data for the user. The data for the user can be hot data, that is, more frequently accessed data. In the SSD cache, each cached page (e.g., 64 kb in size) corresponds to metadata which is stored in a solid-state storage device and stores the mapping information with pages in the solid-state storage device and HDD and data indicating whether the pages are dirty or not. A clean page refers to a page in a solid-state storage device which already has the same page data in the HDD. In contrast, a dirty page refers to a page in a solid-state storage device which does not have the same page data in the HDD, and thus requires copying the page data into the hard disk. In an SSD cache device, each SSD cache can cache certain number of pages (for example, N pages). For this purpose, the SSD cache will allocate N shadow pages for tracking IO history information which is not cached in the solid-state storage device. This history information can be used for determining whether the data is cold data or hot data. In operating, the SSD cache uses background threads to perform some background tasks, for example, promoting the hot data into the SSD cache, flushing a cache device when the cache device is degraded (for example, one solid-state storage device in RAID1 gets faulty, and it is required to store the data from another solid-state storage device into the HDD, so as to avoid data loss), flushing pages when shrinking a SSD cache device (e.g., decreasing one RAID1 from the SSD cache devices), handling over-provisioning when resizing a cache device, handling trash bins, and cleaning dirty pages.

Although multi-layer cache stacks in the multi-layer cache stack technologies, especially SSD cache devices thereof, have been implemented, there are some problems present in the currently used technologies when flushing pages from a solid-state storage device to the HHD.

Firstly, in previous releases of implementations for SSD cache, background threads (i.e. executors designating core 2 as these background threads) which are affined to core 2 (the second core in a multi-core processor) are used to perform some background services, such as promoting user data into an SSD cache, flushing user data into a HDD when a cache device is degraded, flushing user data into the HDD when a cache device is shrunk, cleaning dirty pages into the HDD and evicting pages when the user volume is removed (for example, canceling data when canceling the user volume). These background services are invoked at 15 ms interval. For each service, the background thread builds the corresponding transactions (i.e., operations, for example, canceling, promoting, removing, and the like) and delivers them to an underlying device at each cycle. For flushing user data into the HDD, it is defined in existing systems that the background threads build up to 8 transactions and deliver them to the underlying driver RAID management at each cycle. However, this implementation doesn't consider the system status.

Thus, it is only possible to flush up to 8 pages into the HDD in 15 ms, even when the system is idle. This limits the throughput of the system. For large SSD caches, it will take several hours to flush the page to the HDD when the SSD cache device is degraded, the SSD cache device is shrunk, and the SSD cache is destroyed. Take 200 G SSG cache as an example, there are 1490542 pages consisting the SSD cache. Suppose the hot user data is fully promoted into the SSD cache, in order to flush the 1490542 pages into HDDs, it will take $1490542/8*(15/1000)=2800$ seconds, near one hour.

Secondly, the current implementation uses one fixed depth for all HDDs and Flash drives. The depth refers to the number of transactions that can be executed in parallel and refers to the global depth. Therefore, once a volume reaches the fixed depth, the other volumes cannot continue to operate any more. This also limits the throughput of flushing the pages from the solid-state storage device to HDDs and updating corresponding metadata on the solid-state storage device. For example, if one volume is busy and the number of queued requests reaches the maximum queue depth, the background thread will block on this volume and cannot flush more pages from other volumes. This also lengthens the time to flush all pages from the solid-state storage devices to HDDs.

Moreover, during the procedure of flushing pages from a degraded/shrunk solid-state storage device, this solid-state storage device still will serve IOs. Therefore, this increases the possibility that the clean pages become dirty for being hit by the write command in the above IOs. This also causes more time spent for flushing pages in the solid-state storage device.

In order to at least partially address the above and other possible problems, according to embodiments of the present disclosure, more transactions are built as many as the CPU capability can do, and one queue depth is used per RAID group corresponding to each user volume to avoid one busy flare volume blocking the whole flushing process. The queue depth is dynamic and can be adjusted according to the IO overloads of HDDs and the solid-state storage devices. Specifically, it is discussed below on how to accelerate flushing process when the SSD cache are degraded, the SSD cache is destroyed or the SSD cache devices are removed. The present disclosure builds flushing transactions according to the capacity of the currently used CPU, each RAID group uses one queue depth to avoid one busy flare volume blocking the whole flushing process of the RAID group. The present disclosure uses two lists to maintain cached pages. One list is used to maintain the clean cached pages. The other list is used to maintain the dirty cached pages. The flushing process flushes the clean cache pages firstly. This decreases the possibility that the clean cache pages become dirty. After flushing the clean cached pages, flushing of the dirty cached pages is began.

Specifically, the process of flushing one cached page can be divided into four sub-processes: (1) building a flushing transaction, (2) reading user data from a solid-state storage device, (3) writing user data in the cached page to a HDD; and (4) updating metadata corresponding to the page on the solid-state storage device, which includes, for example, invalidating (i.e., abolishing) the metadata and deleting the metadata. For clean pages, only sub-processes (1) and (4) above are required, and for the dirty pages, all of the above sub-processes (1)-(4) are required.

Sub-process (1) can be executed directly by the CPU because they usually do not involve IO operations, and sub-processes (2)-(4) are typically executed on the solid-state storage devices and HDDs because of involving IOs. In addition, sub-process (2) involves only reading data from the solid-state storage device and usually completes very quickly; therefore, it is not discussed in detail in the present disclosure. In the present disclosure, it is primarily focused on sub-processes (1), (3) and (4).

Figure 3:
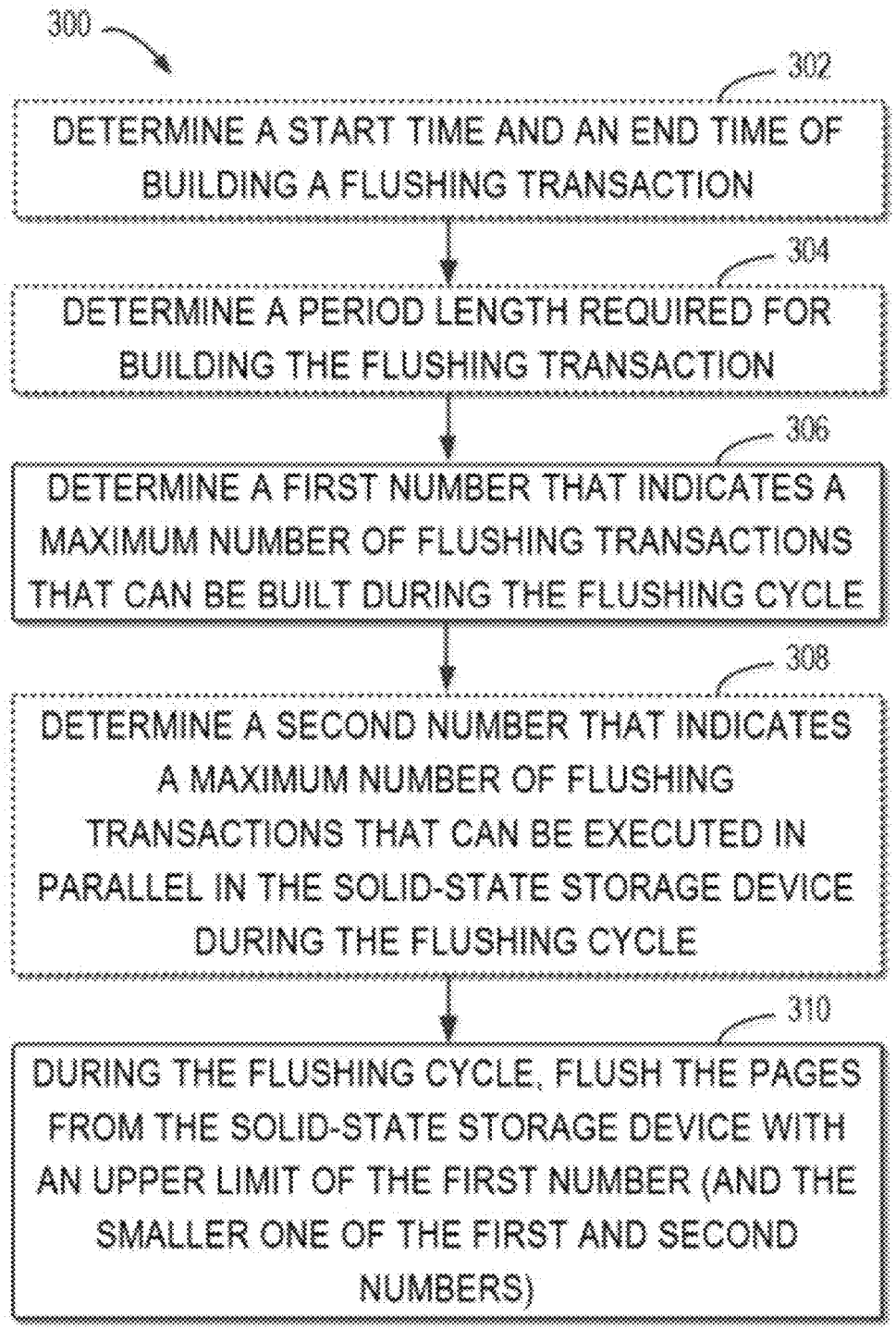
FIG. 3 shows a method 300 for flushing pages from a solid-state storage device in some embodiments.

FIG. 3 shows a method 300 for flushing pages from a solid-state storage device in some embodiments. In method 300, building flushing transactions is involved. Typically, one dedicated thread will be created for building flushing transactions. This dedicated thread, being used as a flushing thread, is bound to one core of a multi-core processor. The process of building a single flushing transaction can be done with reference to conventional methods in the field of storage technology and thus will not be discussed here.

As shown, at 302, a start time and an end time of building a flushing transaction are determined based on a CPU time. A operating system generally provides some interfaces for obtaining the CPU time. For example, a Linux kernel provides the global variable Jiffies to record the CPU time. Therefore, the above interfaces provided by the operating system can be used to measure the time required for building a flushing transaction. Specifically, in order to calculate the time of building a flushing transaction, one sample point can be inserted (1) at the start of building the flushing transaction, and (2) at the end of building the flushing transaction, respectively. As mentioned above, at these two sample points, two Jiffies values J1 and J2 can be obtained, which are the start time and the end time of building the flushing transaction.

At 304, a period length required for building the flushing transaction is determined based on the start time and the end time of building a flushing transaction determined at 302. Specifically, the period length required for building the flushing transaction may be, for example, BT=J2−J1, based on the two Jiffies values J1 and J2 obtained at 302.

It should be understood that, the actions performed at 302 and 304 are used to determine the period length required for building the flushing transaction, and therefore, they are not necessarily required and thus are shown in dashed lines in FIG. 3. For example, when the period length required for building a flushing transaction has been calculated in other ways or can be pre-determined in other ways, there is no need to re-determine the period length required for building the flushing transaction, and the period length required for building the flushing transaction that has been calculated or determined can be directly used. In these cases, both 302 and 304 may be omitted.

At 306, a first number is determined based on the period length of one flushing cycle and the period length required for building a flushing transaction, wherein the first number indicates a maximum number of flushing transactions that can be built during this flushing cycle. For example, taking the above flushing cycle having a period length of 15 ms as an example, because building the flushing transactions is sequentially executed during the flushing cycle, the first number can be built as follows: the first number=15 ms/(J2−J1). It should be understood that this first number is not fixed, and for the purpose of better adjusting the maximum number of the built flushing transactions based on the capabilities of the CPU, the maximum number of flushing transactions that can be built during the flushing cycle during next period of time can be calculated, for example, per certain time interval. In some embodiments, the determination of the first number may be executed for each flushing cycle so as to serve as the maximum number of flushing transactions that can be built in the next flushing cycle.

At 308, a second number is determined based on the response time of RAID to which the solid-state storage device belongs to one flushing transaction, the second number indicating a maximum number of flushing transactions that can be executed in parallel in the RAID to which the solid-state storage device belongs during the flushing cycle.

It should be understood that, the second number involved in 308 is the depth of the RAID to which the solid-state storage device belongs. According to some embodiments of the present disclosure, the SSD cache builds flushing transactions based on the pages in the solid-state storage device during the procedure of flushing a page. If the page is a clean page, a request for invalidating metadata corresponding to the page is sent to the solid-state storage device. If the page is a dirty page, the cached page is firstly written to a hard disk, and then a request for invalidating the metadata corresponding to the page is sent to the solid-state storage device.

Figure 4:
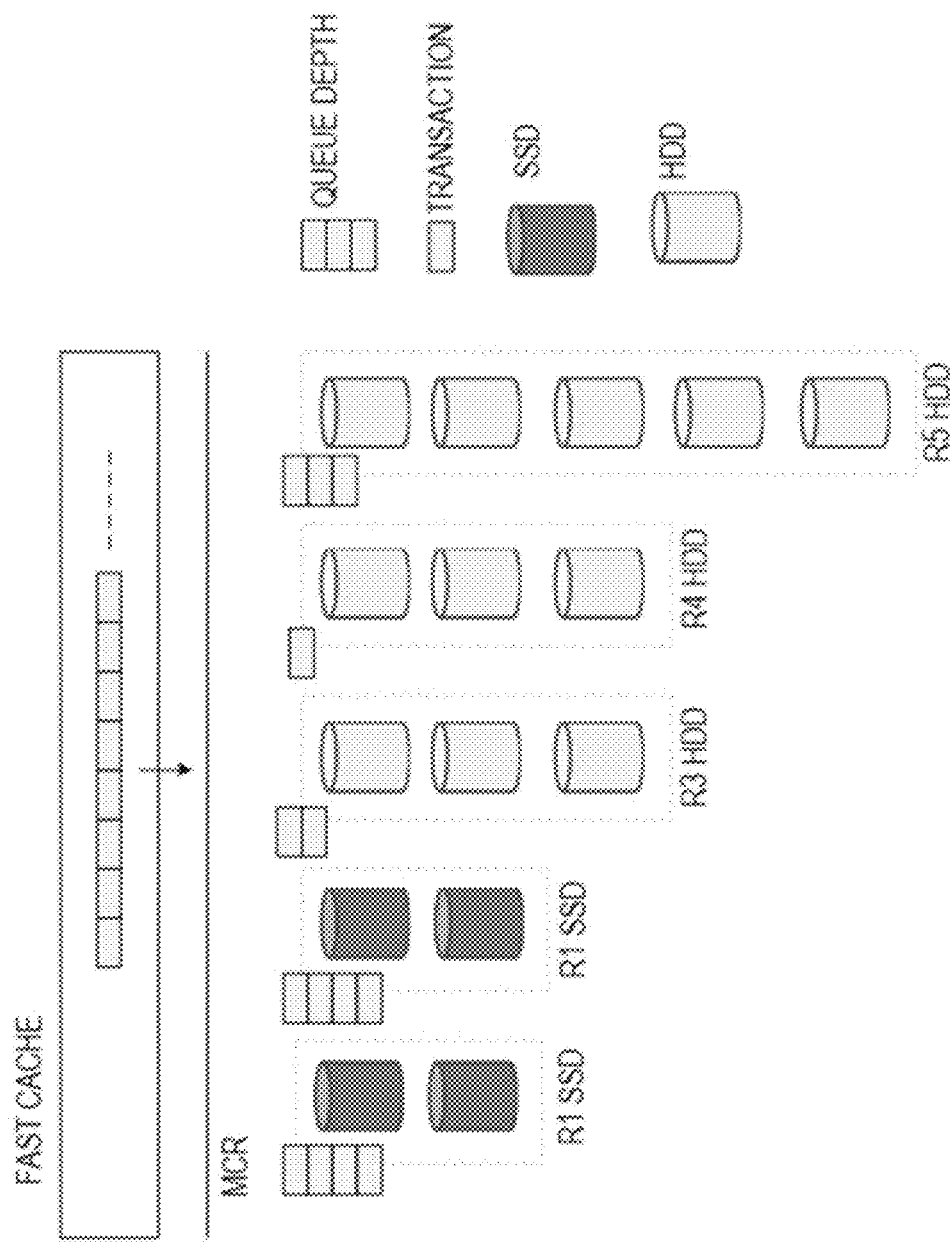
FIG. 4 shows depths of each RAID in RAID management involved in the SSD cache in some embodiments.

FIG. 4 shows depths of each RAID (also referred to as queue depths) in RAID management involved in the SSD cache in some embodiments. As shown in FIG. 4, RAID management involves five RAIDs named R1 SSD, R2 SSD, R3 HDD, R4 HDD, and R5 HDD, respectively, wherein the queue depths of R1 and R2 are 4, the queue depth of R3 is 2, the queue depth of R4 is 1, and the queue depth of R5 is 3.

Figure 5:
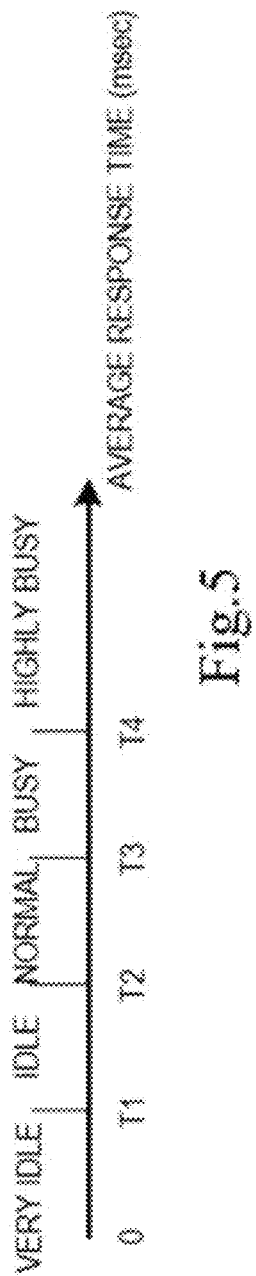
FIG. 5 shows the time sequencing of busy levels of the RAID.

According to some embodiments of the present disclosure, the depths of each RAID in the RAID management, including each of the solid-state storage device RAIDs and the hard disk RAIDs, can be determined. The depths of each RAID indicate a maximum number of flushing transactions that can be executed in parallel in the RAID during the flushing cycle. For one RAID, average response time of a RAID to a flushing transaction is the primary consideration when determining the depth of the RAID. FIG. 5 shows the time sequencing of busy levels of RAIDs. As shown in FIG. 5, according to some embodiments of the present disclosure, the busy levels of RAIDs can be divided into five busy levels according to the average response time (T) of RIADs to flushing transactions, i.e., very idle, idle, normal, busy and highly busy.

According to some embodiments of the present disclosure, queue depths can be directly defined regarding different busy levels of RAIDs in RAID management. The correspondence among busy levels of RAIDs, average response time, and corresponding flushing queue depths can be shown in Table 1 below.

TABLE 1

| RAID busy status | Average Response Time | Flushing Queue Depth |
|---|---|---|
| Very Idle | <=T1 | 64 |
| Idle | >T1 && <=T2 | 32 |
| Normal | >T2 && <=T3 | 16 |
| Busy | >T3 && <=T4 | 8 |
| Highly Busy | >T4 | 0 |

The user's write/read IOs will influence the busy levels of RAIDs as involved during the operating procedure of RAID management. Therefore, the queue depth during the next time period can be calculated, for example, per certain time interval, in order to better adjust the queue depth of a RAID based on the capacity of the RAID. In some embodiments, the determination of busy levels can be executed for each flushing cycle so as to be used for determining the queue depth in the next flushing cycle.

Referring to FIG. 3 again, it should be understood that, because the action performed at 308 is for further adjusting the queue depth of the RAID in accordance with the busy level of the RAID so as to reach an effect of better performance of flushing pages, 309 is not necessarily required and thus is shown in dashed lines in FIG. 3. For example, when the desired improvement in page flushing throughput can be achieved only by adjusting the first number, there is no need to adjust the queue depth of the RAID, but only to perform the page flushing according to the system default. In these cases, 308 may be omitted.

At 310, during the flushing cycle, pages are flushed from the solid-state storage device with an upper limit of the first number or the smaller one of the first number and the second number. According to some embodiments of the present disclosure, when 308 is included in the method 300, pages are flushed from the solid-state storage device with an upper limit of the smaller one of the first number and the second number at 310; and when 308 is omitted from the method 300, pages are flushed from the solid-state storage device at 310 with an upper limit of the first number.

According to some embodiments of the present disclosure, when performing the operation of flushing pages at 310, different ways are taken for clean pages and dirty pages. When pages to be flushed are clean pages, the pages are flushed by directly invalidating the metadata corresponding to the pages. When pages to be flushed are dirty pages, the pages are flushed by copying the data of the page to a hard disk and then invalidating the metadata corresponding to the pages.

Figure 6:
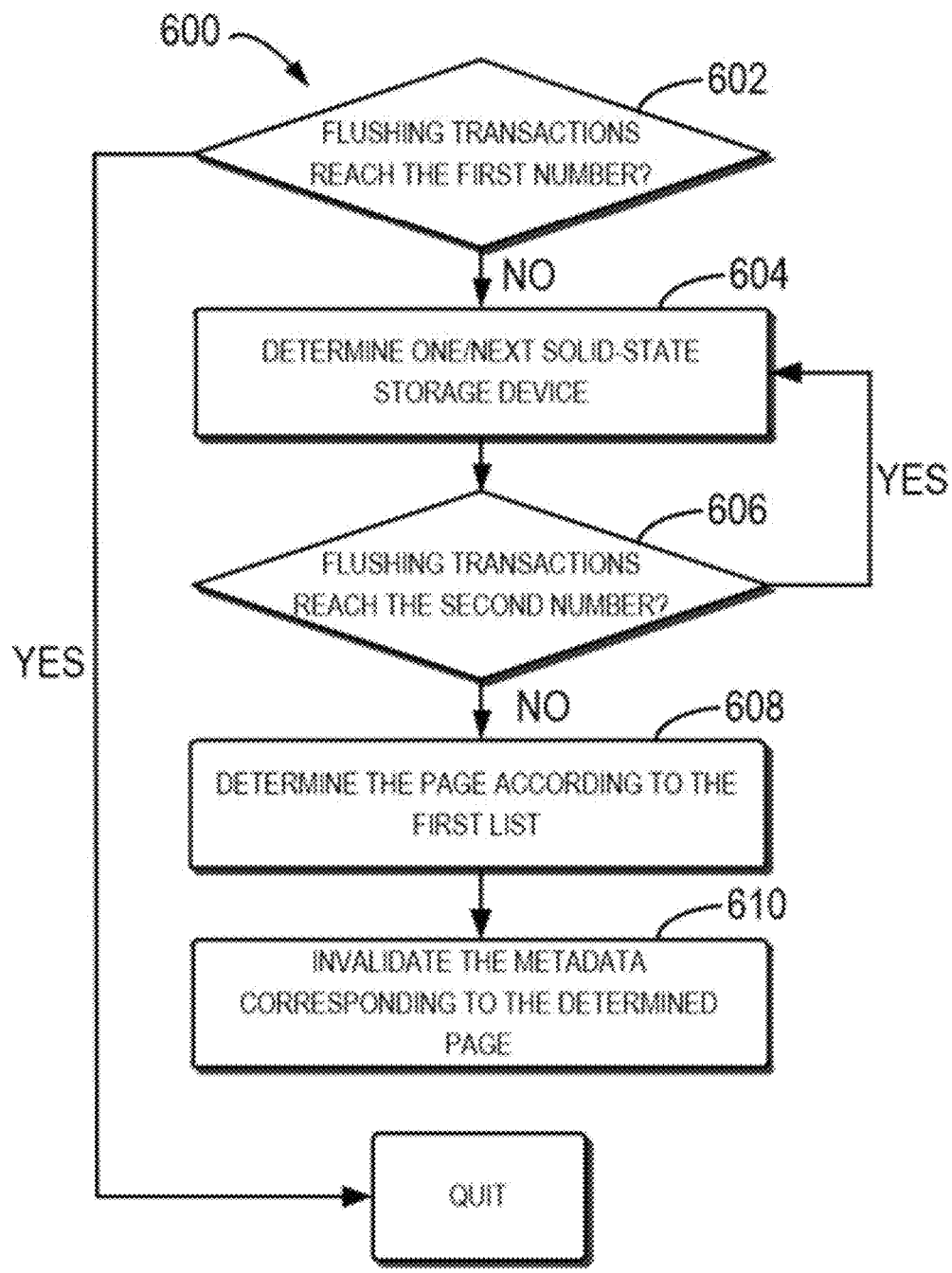
FIG. 6 shows a flow diagram of a method 600 for flushing clean pages from a solid-state storage device in some embodiments.

FIG. 6 illustrates a flow diagram of a method 600 of flushing a clean page from a solid state storage device in some embodiments. In general, the process of flushing a clean page is relatively simple compared to the process of flushing a dirty page, and the page flushing can be implemented by merely invalidating the metadata that corresponds to the clean page on the solid-state storage device. Therefore, flushing a clean page usually takes less time than flushing a dirty page. According to some embodiments of the present disclosure, the flushing of the clean page is performed prior to the flushing of the dirty pages, which can reduce the possibility that the cleans pages which have not been flushed become dirty due to the ongoing IO write operations when flushing the pages from the solid state storage device.

At 602, it is determined whether the flushing transactions constructed during the flushing cycle have reached the first number, i.e., the maximum number of flushing transactions that can be built during the flushing cycle. If the flushing transactions built during the flushing cycle have reached the first number, no more flushing transactions can be built during this flushing cycle, and the method 600 quits the operation directly and waits for the next flushing cycle. If the flushing transactions built during the flushing cycle have not reached the first number yet, more flushing transactions can be built during this flushing cycle, and 604 is performed.

At 604, one or next solid-state storage device used for flushing the page are determined. It should be understood that, since 604 is a looping step, determining one solid-state storage device for flushing pages is executed only when the 604 is executed for the first time, and determining the next solid state storage device for flushing pages is executed when 604 is performed again through looping of steps. According to some embodiments of the present disclosure, a solid-state storage device is determined directly from the solid-state storage devices in another RAID when performing the determining of the next solid-state storage device for flushing pages.

At 606, for the RAID to which the solid-state storage device determined at 604 belongs, it is determined whether the flushing transactions built during the current flushing cycle have reached the second number, i.e., the maximum number of the flushing transactions that can be performed in parallel in the RAID to which the solid-state storage device belongs during the current flushing cycle. If the flushing transactions built during the current flushing cycle have reached the second number, no more flushing transactions can be executed in parallel in the determined solid-state storage device, and the method 600 returns to 604 and continues to determine the next solid-state storage device for flushing pages. If the flushing transactions built during the current flushing cycle have not reached the second number yet, more flushing transactions can be executed in parallel in the determined solid-state storage device, and 608 is performed.

At 608, a clean page for flushing is determined based on a first list indicating clean pages in the solid-state storage device as determined. According to some embodiments of the present disclosure, a first list and a second list are maintained in each solid-state storage device, wherein the first list indicates clean pages in the solid-state storage device and the second list indicates dirty pages in the solid-state storage device. Thus, by using these two lists, each clean page and each dirty page in the solid-state storage device can be located.

It is to be understood that, it is also possible to not maintain both the first list and the second list in each solid-state storage device. At this time, it can be determined whether a page is a clean page or a dirty page by reading the metadata corresponding to the page. Furthermore, even if the first list and the second list are maintained in each solid-state storage device, it still can be determined whether a page is a clean page or a dirty page by reading the metadata corresponding to the page.

According to some embodiments of the present disclosure, the first list, the second list, and the metadata corresponding to the page above are simultaneously stored in the solid state storage device and in the SSD cache of the solid-state storage device. When there is a change in the first list, the second list, and the metadata stored in the solid-state storage device due to being operated, the change will be automatically fed back into the SSD cache.

At 610, the metadata corresponding to the clean page for flushing determined at 608 is invalidated. Then, the process of flushing a clean page is completed.

Figure 7:
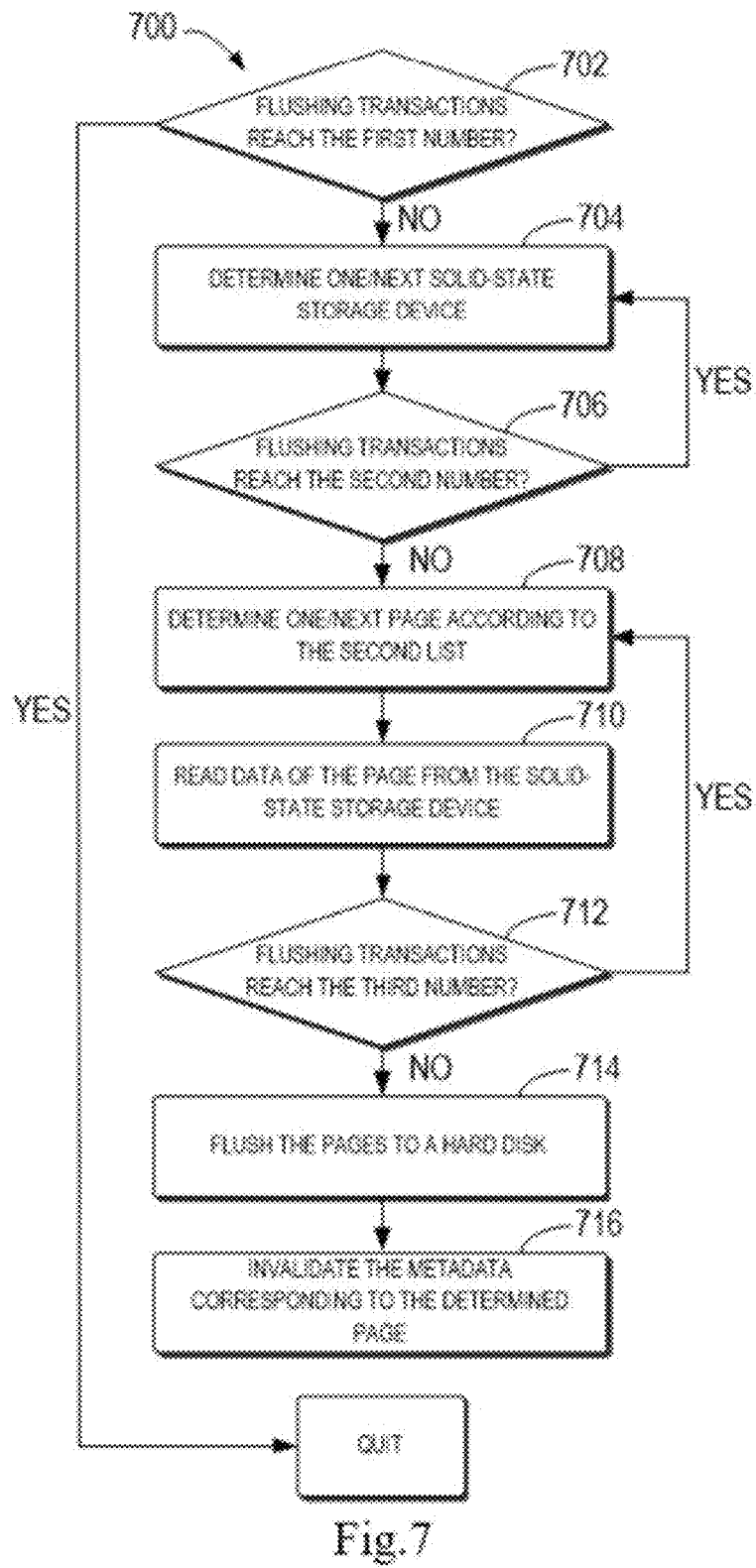
FIG. 7 shows a flow diagram of a method 700 for flushing dirty pages from a solid-state storage device in some embodiments.

FIG. 7 shows a flow diagram of a method 700 for flushing a dirty page from a solid-state storage device in some embodiments. As described above, the method 700 for flushing a dirty page from a solid-state storage device has more steps than the method 600 for flushing a clean page from a solid-state storage device, i.e., the steps in relation to flushing data in the dirty pages in the solid-state storage device to the hard disk.

At 702, it is determined whether the flushing transactions built during the flushing cycle have reached the first number, i.e., the maximum number of flushing transactions that can be built during the flushing cycle. If the flushing transactions built during the flushing cycle have reached the first number, no more flushing transactions can be built during this flushing cycle, and the method 700 directly quits the operation and waits for the next flushing cycle. If the flushing transactions built during the flushing cycle have not reached the first number yet, more flushing transactions can be built during this flushing cycle, and then 704 is performed.

At 704, one or next solid-state storage device used for flushing the page are determined. It should be understood that, because 704 is a looping step, determining one solid-state storage device for flushing the pages is executed only when the 704 is executed for the first time, and determining the next solid state storage device for flushing the pages is executed when 704 is performed through looping of steps. According to some embodiments of the present disclosure, a solid-state storage device is determined directly from the solid-state storage devices in another RAID when performing the determining of the next solid-state storage device for flushing pages.

At 706, for the RAID to which the solid-state storage device determined at 704 belongs, it is determined whether the flushing transactions built during the current flushing cycle has reached the second number, i.e., the maximum number of the flushing transactions that can be performed in parallel in the RAID to which the solid-state storage device belongs during the current flushing cycle. If the flushing transactions built during the current flushing cycle have reached the second number, no more flushing transactions can be executed in parallel in the determined solid-state storage device, and the method 700 returns to 704 and continues to determine the next solid-state storage device for flushing pages. If the flushing transactions built during the current flushing cycle have not reached the second number yet, more flushing transactions can be executed in parallel in the determined solid-state storage device, and 708 is performed.

At 708, a dirty page for flushing is determined based on the first list of the dirty pages in the solid-state storage device as determined. It should be understood that, because 708 is a looping step, determining one dirty page for flushing is executed only when 708 is executed for the first time, and determining the next dirty page for flushing is executed when 708 is executed again through looping of steps.

At 710, the data is read from the dirty page determined at 708. At 712, the hard disk to which the data read at 710 is to be stored is determined and it is determined whether the flushing transactions built during the current flushing cycle have reached the third number based on the RAID to which the determined hard disk belongs, i.e., the maximum number of flushing transactions that can be performed in parallel in the RAID to which the hard disk belongs during the flushing cycle.

If the flushing transactions built during the current flushing cycle have reached the third number, no more flushing transactions can be executed in parallel in the determined hard disk, and the method 700 returns to 708 and continues to determine the next dirty page for flushing. If the flushing transactions built during the current flushing cycle have not reached the third number yet, the determined hard disk can execute more flushing transactions in parallel, and then 714 is performed.

At 714, the data in the dirty page determined at 708 is flushed from the solid-state storage device determined at 704 to the hard disk determined at 712. At 716, the metadata corresponding to the dirty page for flushing determined at 708 is invalidated. Then, the process of flushing a dirty page is completed.

Figure 8:
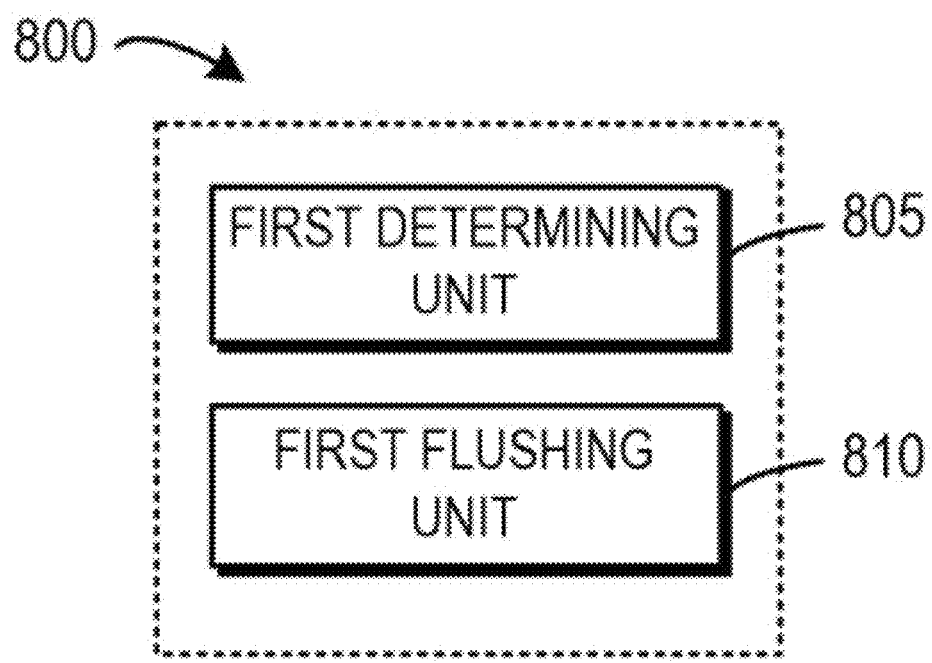
FIG. 8 shows a block diagram of an apparatus 800 in some embodiments.

FIG. 8 shows a block diagram of an apparatus 800 in some embodiments. As shown in FIG. 8, the apparatus 800 includes a first determining unit 805 configured to determine a first number based on a period length of one flushing cycle and a period length required for building one flushing transaction, wherein the first number indicates a maximum number of flushing transactions that can be built during the flushing cycle; and a first flushing unit 810 configured to flush paged from the solid-state storage device with an upper limit of the first number during the flushing cycle.

In some embodiments, the apparatus 800 may further include a second determining unit, configured to determine a start time and an end time of building a flushing transaction based on the CPU time; and a third determining unit, configured to determine the period length required for building the flushing transaction based on the start time and the end time of building a flushing transaction as determined by the second determining unit.

In some embodiments, the apparatus 800 may further include: a fourth determining unit, configured to determine a second number based on the response time of a RAID to which the solid-state storage device belongs to one flushing transaction, the second number indicating a maximum number of flushing transactions that can be executed in parallel in the RAID to which the solid-state storage device belongs during this flushing cycle; and a second flushing unit, configured to flush pages from the solid-state storage device with an upper limit of the smaller one of the first number and the second number during the flushing cycle.

In some embodiments, the first flushing unit 810 may further include: a clean page flushing unit, configured to invalidate metadata corresponding to a page to be flushed in response to the page to be flushed being a clean page; and a dirty page flushing unit, configured to, in response to a page to be flushed being a dirty page, copy the data of the page to a hard disk and invalidate the metadata corresponding to the page.

In some embodiments, the dirty page flushing unit may further include: a fifth determining unit, configured to determine whether the flushing transactions built during the current flushing cycle have reached a third number according to the RAID to which the determined hard disk belongs; and a sixth determining unit, configured to flush pages to the hard disk with an upper limit of the third number during the flushing cycle.

In some embodiments, the apparatus 800 may further include a maintaining unit configured to maintain first lists and second lists in each of the solid-state storage devices, wherein the first list indicates clean pages in the solid-state storage device, and the second list indicates dirty pages in the solid-state storage device.

In some embodiments, the clean page flushing unit operates before the dirty page flushing unit so that the flushing of the clean pages precedes the flushing of the dirty pages.

It should be understood that, each of the units described in the apparatus 800 corresponds to each of the steps in methods 300, 600, and 700 described with reference to FIGS. 1 to 6, respectively. Thus, the operations and features described above in connection with FIGS. 1 to 7 are equally applicable to the apparatus 800 and the units contained therein and have the same effects. Therefore, the details thereof are not discussed here.

The units included in apparatus 800 can be implemented in a variety of ways, including software, hardware, firmware, or any combination thereof. In one embodiment, one or more units may be implemented by using software and/or firmware, e.g., machine-executable instructions stored on a storage medium. In addition to machine-executable instructions or alternatively, some or all of the units in apparatus 800 can be implemented at least partially by one or more hardware logic components. By way of example but not limitation, exemplary types of hardware logic components that can be used include field programmable gate arrays (FPGAs), application-specific integrated circuits (ASICs), application-specific standard parts (ASSPs), system-on-chip (SOC), complex programmable logic devices (CPLD), etc.

The units of apparatus 800 shown in FIG. 8 may be implemented partially or wholly as a hardware module, a software module, a firmware module, or any combination thereof. In particular, in some embodiments, the flows, methods, or processes described above can be implemented by hardware in a base station or a terminal device. For example, the base station or terminal device may implement methods 300 and 700 by using its emitters, receivers, transceivers and/or processors or controllers.

Figure 9:
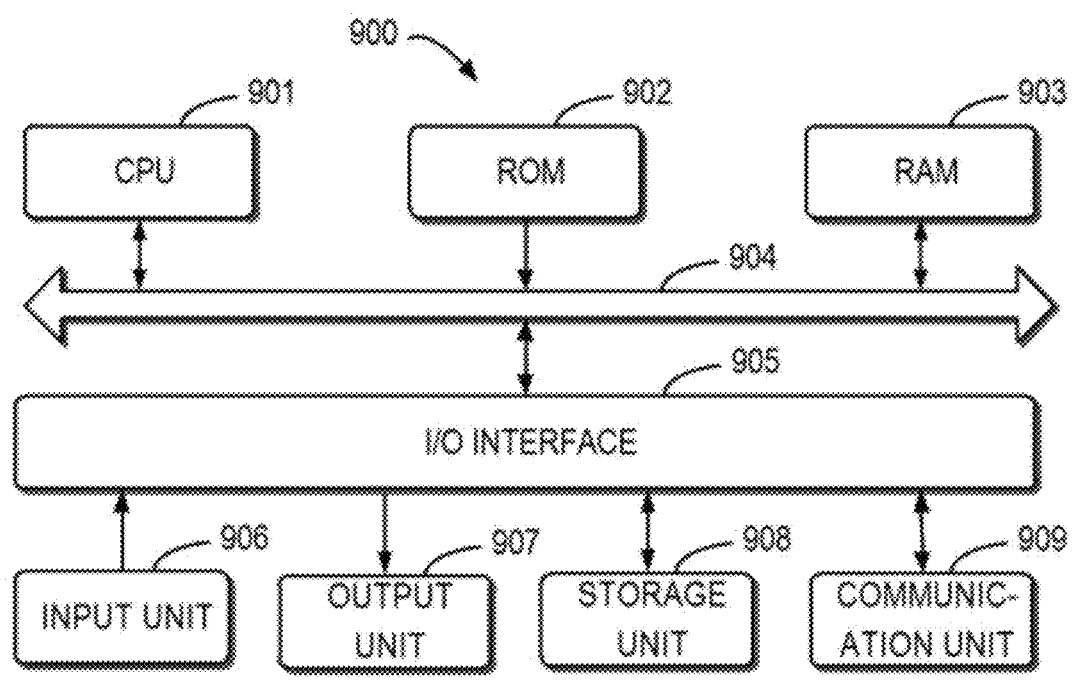
FIG. 9 shows a block diagram of a device 900 that can be used to implement embodiments of the present disclosure.

FIG. 9 shows a block diagram of a device 900 that can be used to implement embodiments of the present disclosure. The device 900 may be used to implement an electronic device which includes, for example, the electronic devices as described above. As shown, the device 900 includes a central processing unit (CPU) 901 which can execute a variety of appropriate actions and processes according to computer program instructions stored in a read-only memory (ROM) 902 or computer program instructions loaded from a storage unit 908 into a random-access memory (RAM) 903. Various programs and data required for the device 900 to operate can also be stored in the RAM 903. CPU 901, ROM 902, and RAM 903 are connected to each other via a bus 904. An input/output (I/O) interface 905 is also connected to the bus 904.

A plurality of components in the device 900 are connected to the I/O interface 905, including: an input unit 906, e.g., a keyboard, a mouse, and the like; an output unit 907, e.g., various types of displays, speakers, and the like; a storage unit 908, e.g., a magnetic disc, a compact disc, and the like; and a communication unit 909, e.g., a network card, a modem, a wireless communication transceiver, and the like. The communication unit 909 allows the device 900 to exchange information/data with other devices via a computer network such as the Internet and/or various telecommunication networks.

In some embodiments, the processing unit 901 may be configured to execute various processes and processing steps described above, e.g., methods 300, 600, and 700. For example, in some embodiments, methods 300, 600, and 700 may be implemented as computer software programs that are tangibly included in a machine-readable medium (e.g., storage unit 908). In some embodiments, a part or all of the computer programs may be loaded and/or installed into the device 900 via the ROM 902 and/or the communication unit 909. When the computer program is loaded into the RAM 903 and executed by the CPU 901, one or more steps of the methods 300, 600, and 700 described above may be executed.

According to one embodiment of the present disclosure, there is also provided a computer program product that is tangibly stored in a non-transient computer-readable medium and comprises machine-executable instructions, the machine-executable instructions, when being executed, cause the machine to execute the steps of the methods 300, 600 and 700 according to the present disclosure.

The methods and devices for flushing pages from a solid-state storage device involved according to embodiments of the present disclosure may provide advantages that are obviously superior to the prior art. Specifically, the implementation of the previous SSD cache limits the promoting number, the flushing number, and the like to fixed numbers. Therefore, it will take very long time to flush pages to a hard disk or evict pages from the solid-state storage device, even if the central processing unit is not busy and the back-end solid-state storage devices and the hard disks have much volume for processing read/write IOs. In contrast, the methods and devices for flushing pages from a solid-state storage device involved according to embodiments of the present disclosure can be utilized to speed up the flushing of cache devices and the shrinking of cache devices by dynamically adjusting the number of flushing according to the usage of the central processing unit, the response time and the queue depth, and the like. For example, according to an embodiment of the present disclosure, if the number of flushing is adjusted to twice of the current number, the time spent for shrinking the cache will be reduced to half of the current time.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. When various aspects of the example embodiments of the present disclosure are illustrated and described as block diagrams, flowcharts, or using some other graphical representations, it will be understood that the blocks, apparatus, systems, techniques or methods described herein may be implemented in, as non-limiting examples, hardware, software, firmware, special purpose circuits or logic, general purpose hardware or controller or other computing devices, or some combinations thereof.

As an example, the embodiments of the present disclosure may be described in the context of machine-executable instructions, which, for example, are included in program modules executed in devices on a real or virtual processor of a target. In general, program modules include routines, programs, libraries, objects, classes, components, data structures, or the like, and perform specific tasks or implement specific abstract data structures. In various embodiments, functions of the program modules can be merged or split among the described program modules. Machine-executable instructions for program modules may be executed locally or in distributed devices. In distributed devices, the program modules may be located in both local and remote storage media.

Computer program codes for carrying out the methods of the present disclosure may be written in one or more programming languages. These computer program codes may be provided to processors of a general purpose computer, special purpose computer, or other programmable data processing apparatuses, such that the program codes, when being executed by the processors of the computers or other programmable data processing apparatuses, cause the functions/operations specified in the flowcharts and/or block diagrams to be implemented. The program codes may executed entirely on a computer, partly on the computer, as a stand-alone software package, partly on the computer and partly on a remote computer or entirely on the remote computer or server.

In the context of the disclosure, a machine-readable medium may be any tangible media that may contain or store programs for an instruction execution system, apparatus, or device or used by the instruction execution system, apparatus, or device. The machine-readable medium may be a machine-readable signal medium or a machine-readable storage medium. A machine-readable medium may include but not limited to electronic, magnetic, optical, electromagnetic, infrared, or semiconductor systems, apparatuses, or devices, or any suitable combinations thereof. More specific examples of the machine-readable storage medium include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combinations thereof.

Further, while operations are depicted in a particular order, this should not be understood as requiring that such operations be performed in the particular order shown or in sequential order, or that all illustrated operations be performed to achieve desirable results. In certain circumstances, multitasking or parallel processing may be advantageous. Likewise, while several specific implementation details are contained in the above discussions, these should not be construed as limiting the scope of any disclosure or claims, but should be construed as descriptions of certain embodiments that may be specific to particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combinations.

While the subject matter has been described in languages specific to structural features and/or method actions, it should be understood that the subject matters defined in the appended claims are not limited to the specific features or actions described above. Rather, the specific features and actions described above are disclosed as example forms for implementing the claims.

What is claimed is:

1. A method of flushing pages from a solid-state storage device, comprising:
    determining a limit number based on a response time of the solid-state storage device to one flushing transaction, the limit number indicating a maximum number of flushing transactions that can be executed in parallel in the solid-state storage device during the flushing cycle; and
    during the flushing cycle, flushing the pages from the solid-state storage device with an upper limit of the limit number.

2. The method according to claim 1, wherein the limit number is determined based on a response time to one flushing transaction of a RAID group to which the solid-state storage device belongs, the limit number indicating a maximum number of flushing transactions that can be executed in parallel in the RAID group to which the solid-state storage device belongs during the flushing cycle.

3. The method according to claim 2, wherein the limit number is related to a depth of a RAID queue for the RAID group to which the solid-state storage device belongs.

4. The method according to claim 3, wherein the solid-state storage device is one of a plurality of storage devices belong to respective RAID groups and having respective distinct RAID queue depths, and wherein the RAID queue depths of each RAID group indicate respective maximum numbers of flushing transactions that can be executed in parallel in the respective RAID groups during the flushing cycle.

5. The method according to claim 4, wherein the RAID queue depths correspond to respective busy levels of the RAID groups including at least idle, normal and busy, the RAID queue depths decreasing with increasing busy level.

6. The method according to claim 5, wherein a level of write/read IOs influences the busy levels of RAIDs, and the RAID queue depths are dynamically adjusted accordingly, the busy levels being assessed for a given flushing cycle and used to determine the respective RAID queue depths in a next flushing cycle.

7. The method according to claim 1, wherein the limit number is a second limit number, and further comprising:
    determining a first limit number based on a period length of one flushing cycle and a period length required for building one flushing transaction, the first limit number indicating a maximum number of flushing transactions that can be built in the flushing cycle; and
    during the flushing cycle, flushing the pages from the solid-state storage device with an upper limit of a smaller one of the first and second limit numbers.

8. The method according to claim 7, further comprising:
    determining, based on a central processing unit (CPU) time, a start time and an end time of building the flushing transaction; and
    determining, based on a difference between the start time and the end time, the period length required for building the flushing transaction.

9. The method according to claim 7, wherein flushing the pages comprises:
    in response to a page to be flushed being a clean page, invalidating metadata corresponding to the page; and
    in response to the page to be flushed being a dirty page, copying data of the page into a hard disk; and
    invalidating the metadata corresponding to the page.

10. The method according to claim 9, wherein copying the data of the page into the hard disk comprises:
    determining a third limit number based on a response time of the hard disk to one flushing transaction, the third limit number indicating a maximum number of flushing transactions that can be executed in parallel in the hard disk during the flushing cycle; and
    during the flushing cycle, flushing the page into the hard disk with an upper limit of the third limit number.

11. The method according to claim 10, further comprising:
    maintaining a first list and a second list in the solid-state storage device, the first list indicating clean pages, and the second list indicating dirty pages; and
    performing the flushing of the pages using the first list and the second list.

12. The method according to claim 9, wherein the flushing of the clean page precedes the flushing of the dirty page.

13. An electronic device comprising:
    a processor; and a memory coupled to the processor and storing instructions executable by the processor, the instructions, when being executed by the processor, causing the device to:

determine a limit number based on a response time of the solid-state storage device to one flushing transaction, the limit number indicating a maximum number of flushing transactions that can be executed in parallel in the solid-state storage device during the flushing cycle; and during the flushing cycle, flush the pages from the solid-state storage device with an upper limit of the limit number.

14. The electronic device according to claim 13, wherein the limit number is determined based on a response time to one flushing transaction of a RAID group to which the solid-state storage device belongs, the limit number indicating a maximum number of flushing transactions that can be executed in parallel in the RAID group to which the solid-state storage device belongs during the flushing cycle.

15. The electronic device according to claim 14, wherein the limit number is related to a depth of a RAID queue for the RAID group to which the solid-state storage device belongs.

16. The electronic device according to claim 15, wherein the solid-state storage device is one of a plurality of storage devices belong to respective RAID groups and having respective distinct RAID queue depths, and wherein the RAID queue depths of each RAID group indicate respective maximum numbers of flushing transactions that can be executed in parallel in the respective RAID groups during the flushing cycle.

17. The electronic device according to claim 16, wherein the RAID queue depths correspond to respective busy levels of the RAID groups including at least idle, normal and busy, the RAID queue depths decreasing with increasing busy level.

18. The electronic device according to claim 17, wherein a level of write/read IOs influences the busy levels of RAIDs, and the RAID queue depths are dynamically adjusted accordingly, the busy levels being assessed for a given flushing cycle and used to determine the respective RAID queue depths in a next flushing cycle.

19. The electronic device according to claim 13, wherein the limit number is a second limit number, and wherein the instructions, when being executed by the processor, further cause the device to:

determine a first limit number based on a period length of one flushing cycle and a period length required for building one flushing transaction, the first limit number indicating a maximum number of flushing transactions that can be built in the flushing cycle; and during the flushing cycle, flush the pages from the solid-state storage device with an upper limit of a smaller one of the first and second limit numbers.

20. A computer program product for flushing pages from a solid-state storage device, the computer program product comprising:

a non-transitory computer readable medium encoded with computer-executable program code for flushing pages from the solid-state storage device, the code configured to enable the execution of:

determining a limit number based on a response time of the solid-state storage device to one flushing transaction, the limit number indicating a maximum number of flushing transactions that can be executed in parallel in the solid-state storage device during the flushing cycle; and during the flushing cycle, flushing the pages from the solid-state storage device with an upper limit of the limit number.

* * * * *